Nov. 14, 1961 R. B. LONG 3,008,261
ANIMAL TRAP
Filed May 31, 1960
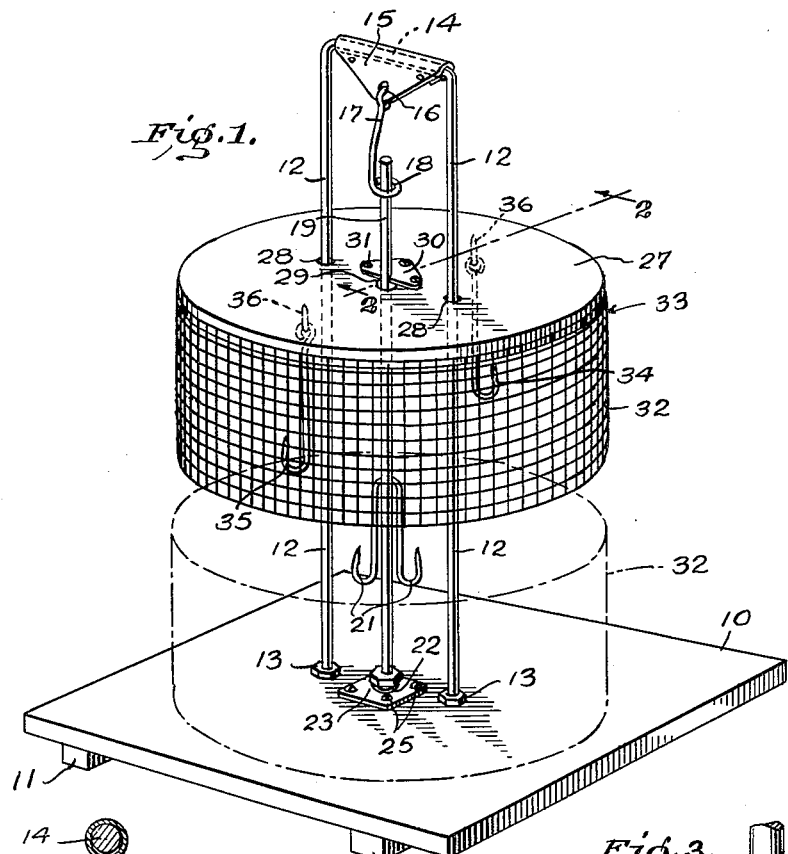
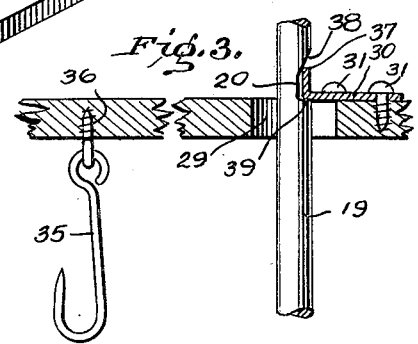
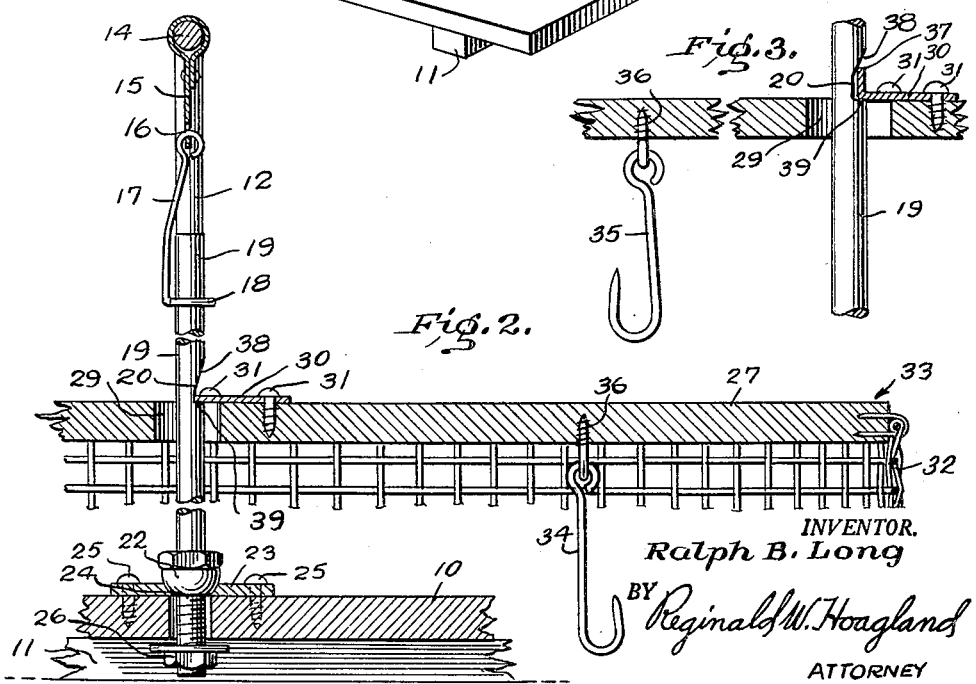
INVENTOR.
Ralph B. Long
BY Reginald W. Hoagland
ATTORNEY

United States Patent Office 3,008,261
Patented Nov. 14, 1961

3,008,261
ANIMAL TRAP
Ralph B. Long, 503 Warren St., Flint 5, Mich.
Filed May 31, 1960, Ser. No. 32,767
5 Claims. (Cl. 43—62)

This invention relates to animal traps and it consists in the combinations, constructions, and arrangements of parts herein described and claimed.

Heretofore, in animal traps of the type in which a cage is mounted for reciprocal cooperation with a base and, when set, is releasably supported at a distance from said base against spring pressure, the force of gravity, or an equivalent, the trigger mechanism and support elements have been of several different types. The use of a pivoted hook or trigger connected by flexible means to a bait hook has the disadvantage of complexity and of masking the bait in one direction by the means supporting said bait hook. In the type of animal trap wherein the cage is connected to a notched rod, the notch of which is held by a lever designed to be dislodged by movement of a baited rod removably holding said lever, considerable difficulty is experienced in attempting to achieve the critical adjustment necessary for sensitivity of response, due to the number of parts and the manner in which they cooperate. The type of device wherein a vertical, rotatable rod having bait holding means thereon and, at one end thereof, a shoulder for supporting the cage in raised relation to the base, wherein rotation of said rod is designed to release said cage, is responsive only to down-rotating motion of the bait and is non-responsive to all non-rotating forces.

An object of the invention is to provide a gravity powered animal trap of simple and inexpensive construction with a trigger mechanism providing a positive response to normal contact.

A further object of the invention is to provide an animal trap utilizing a pivoted, notched supporting rod.

Still another object is to provide an animal trap in which bait retaining means is attached to the cage.

Still another object is to provide an animal trap which may be tripped from each of two sides thereof.

These, together with various auxiliary features and objects of the invention which will become apparent in the following description, are attained by the present invention, preferred embodiments of which have been illustrated, by way of examples only, in the accompanying drawings, wherein:

FIGURE 1 is a perspective view of an animal trap in set position, the position of the cage in sprung position being outlined by dotted lines.

FIGURE 2 is a fragmentary vertical transverse section of an animal trap taken on line 2—2 of FIGURE 1.

FIGURE 3 is a fragmentary vertical transverse section taken on line 2—2 of FIGURE 1, showing a modified form of catch plate.

Referring now more particularly to the drawings, the horizontal base 10 supported by feet 11 in turn supports an inverted U shaped rod 12 rigidly connected to said base 10 as partially shown by nuts 13 threaded on the ends of said rod 12.

In the preferred embodiment, rod 12 has a flat bight 14 from which depends arm 15 rotatably supported by bight 14. Arm 15 may be formed by a single piece of material folded over bight 14 and secured in the form of a loop by rivets or other convenient means so as to loosely embrace bight 14 and easily rotate thereon. Extension arm 15 bears an opening 16 from which depends arm extension 17 by a loop at one end. The other end of arm extension 17 terminates in a horizontal loop 18.

Supporting rod 19 bearing notch 20 and bait retaining means such as hooks 21 passes through loop 18 and is pivotally supported by base 10 by means of ball 22 removably and rotatably embraced within socket plate 23 and socket bed 24. Socket plate 23 and socket bed 24 are affixed to base 10 by suitable means such as screws 25 and threadably connected nut 26.

Cage top 27 bears three openings in mutual linear relationship, through two of which 28 pass the vertical portions of rod 12. Supporting rod 19 passes through the third and center opening 29 in cage top 27. Openings 28 are sufficiently large so that cage top 27 may freely reciprocate upon rod 12. Catch plate 30 is rigidly attached to cage top 27 as by screws 31 so as to protrude partly across center opening 29 and to be capable of engaging notch 20 in supporting rod 19. Opening 29 is sufficiently large so that cage top 27 and catch plate 30 may reciprocate upon rod 19 when catch plate 30 is not engaged in notch 20.

Wire mesh 32 surrounds cage top 27 and is fastened thereto at its periphery, and depends therefrom so as to form, in combination with cage top 27, a cage 33 capable of closure with base 10. Bait hooks 34 and 35 depend from cage top 27 within cage 33, attached by means such as screw means 36.

Catch plate 30 may be provided with lip 37 overhanging center opening 29, disposed so as to rest within notch 20 of rod 19 when catch plate 30 engages said notch 20 and of such length as to contact the sloping wall 38 of notch 20 and, by rotation, disengage catch plate 30 from the seat 39 of notch 20 upon slight downward movement of bait hook 35 on the opposite side of center hole 29 from catch plate 30. Lip 37 may be adjusted so as to provide the desired degree of sensitivity of responsive movement of catch plate 30 and cage 33 to downward movement of bait hook 35.

In operation, bait hooks 21, 34 and 35 are baited with suitable bait to attract the animal desired to be captured. Cage 33 is then raised in parallel relation to base 10, rods 12 and 19 sliding through openings 28 and center opening 29, respectively. Catch plate 30 is engaged with notch 20 so as to rest upon the seat 39 thereof, and maintain cage 33 at rest in a raised position. The trap is now set.

When an animal, attracted by the bait, enters the trap and attempts to consume or remove the bait from bait hooks 34 or 35, cage top 27 and catch plate 29, being connected to bait hooks 34 and 35, are rotated with respect to notch 20 and disengaged therefrom. When an animal attempts to consume or remove bait from hook 21, rod 19 is rotated upon ball 22, socket plate 23, and socket bed 24, with respect to catch plate 30, so as to disengage catch plate 30 from rod 19. Arm 15 and arm extension 17 loosely embrace rod 19 at its upper end so as to permit such rotation and disengagement. Cage 33 is thus permitted to fall by gravitation so as to close with base 10, guidance being provided by rod 12 sliding through openings 28. The animal is thus trapped inside of cage 33 which is in closed position against base 10.

Cage 33 may be weighted, or cage top 27 provided with a dog, so as to prevent a trapped animal from raising cage 33 should the natural weight of cage 33, of itself, be insufficient so to do for a particular species of trapped animal.

The ball and socket joint composed of ball 22, socket plate 23 and socket bed 24, minimizes friction encountered by rod 19 in pivoting upon base plate 10 and provides a convenient seat for rod 19. Arm 15, being but loosely attached to bight 14, and arm extension 17, are free to rotate and articulate so as to loosely guide rod 19 and to maintain it in a general upright position when cage 33 is in its lower, or sprung, position. Arm 15 and arm extension 17, however, do not hamper rod 19 from rotating freely upon base 10 so as to be engaged by, or disengaged from, catch plate 30, when catch plate 30 and cage 33 are in the set position.

In view of the foregoing description taken in conjunction with the accompanying drawings, it is believed that a clear understanding of the construction, operation, and advantages of the animal trap will be quite apparent to those skilled in the art.

It is to be understood, however, that even though there is herein shown and described a preferred embodiment of the invention, various changes may be made without departing from the spirit and full intendment of the invention.

What is claimed is:

1. An animal trap comprising: a horizontal base; an inverted U-shaped rod connected to said base; a cage, having three openings in the top thereof in mutual colinear relationship, slideably mounted upon said U-shaped rod by the arms of said U-shaped rod passing through the outer pair of said openings, and having bait supporting means attached thereto at a point not colinear with said three openings; a notched supporting rod, having bait supporting means attached thereto, extending upward through the center opening in said cage top and supported at its lower end upon said base by pivot means permitting it to pivot in any direction upon said lower end; holding means depending from the bight of said U-shaped rod and loosely retaining the upper end of said supporting rod in a generally upright position; a catch plate mounted upon said cage top, said catch plate being disposed to be engageable with the notch in said supporting rod when said supporting rod is disposed vertically but to disengage from said notch when said supporting rod is pivoted about its lower end in a direction away from said catch plate by non-rotary motion of the bait supporting means attached to said rod, and also to disengage from said notch when said cage top is tilted by downward movement of the bait supporting means attached to said cage top.

2. An animal trap comprising: a horizontal base; an inverted U-shaped rod connected to said base; a cage, having three openings in the top thereof in mutual colinear relationship, slideably mounted upon said U-shaped rod, the arms of said U-shaped rod passing through the outer pair of said openings; bait supporting means attached to the underside of said cage top at a point not colinear with said three openings; a notched supporting rod, having bait supporting means attached thereto, extending upward through the center opening in said cage top and supported at its lower end upon said base by means permitting it to pivot in any direction upon said lower end; holding means depending from the bight of said U-shaped rod and loosely retaining the upper end of said supporting rod; a catch plate mounted upon said cage top and protruding partly across the said center opening therein so as to be capable of engaging the notch of said supporting rod when said notch is disposed to face said catch plate, said cage top is disposed horizontally, and said supporting rod is disposed vertically, but to disengage from said notch when said supporting rod and notch are tilted from a vertical position and away from said catch plate by horizontal non-rotary movement of the bait supporting means attached to said supporting rod, and also to disengage from said notch when said cage top is tilted from a horizontal position by downward movement of the bait supporting means attached to said cage.

3. An animal trap comprising: a horizontal base; a cage, having a cage top and cage means depending from said cage top, said cage top having three openings therein in mutual colinear relationship and a bait hook depending from said cage top at a point not colinear with said openings; an inverted U-shaped rod connected to said base, the arms of said U-shaped rod passing through the outer pair of said openings in said cage top to permit said cage top to translate vertically and to tilt upon said U-shaped rod; a supporting rod, having a bait hook and a notch therein and a ball at the lower end thereof, and supported by socket means attached to said base so as to be free to tilt upon said socket as a pivot, said supporting rod extending upward through the center opening in said cage top; an arm, having an opening therein, rotatably attached to the bight of said U-shaped rod; an arm extension depending from and connected at its upper end to said arm through said opening in said arm, the lower end thereof forming a horizontal loop surrounding and loosely retaining said supporting rod in a near-upright position while permitting said supporting rod to pivot upon said ball and socket from an upright position; a catch plate mounted upon said cage top and protruding partly across the center of said openings in said cage top so as to be capable of engaging the notch of said supporting rod when said notch is disposed to face said catch plate and said cage top is horizontal and to disengage from said notch when said rod is tilted away from said catch plate by horizontal non-rotary movement of the bait hook attached to said supporting rod and also to disengage from said notch when said cage top is tilted by downward movement of the bait hook depending therefrom.

4. In an animal trap having a horizontal base, an inverted U-shaped rod, a cage having a plurality of openings in the top thereof in mutual colinear relationship and slideably and tiltably mounted upon said U-shaped rod, a catch plate connected to the top of said cage, and a notched supporting rod disposed to releasably engage said catch plate, the improvement comprising, in combination, bait supporting means depending from said cage top at a point not colinear with said openings, and a lip on said catch plate to disengage said catch plate from the notch of said supporting rod when said cage top is tilted by downward motion of said base supporting means.

5. In an animal trap having a horizontal base, an inverted U-shaped rod, a cage having a plurality of openings in the top thereof in mutual colinear relationship and slideably mounted upon said U-shaped rod, a catch plate connected to the top of said cage, and a notched supporting rod disposed to releasably engage said catch plate, the improvement comprising, in combination, pivot means intermediate said base and the lower end of said supporting rod, means depending from said U-shaped rod to loosely retain said supporting rod in a generally upright position, and bait supporting means connected to said supporting rod intermediate said notch and said pivot means, to disengage said notch from said catch plate when said supporting rod is pivoted about said pivot means in a direction away from said catch plate by non-rotary motion of said bait supporting means.

References Cited in the file of this patent

UNITED STATES PATENTS 196,436      Crawford _____ Oct. 23, 1877